Figure 1:
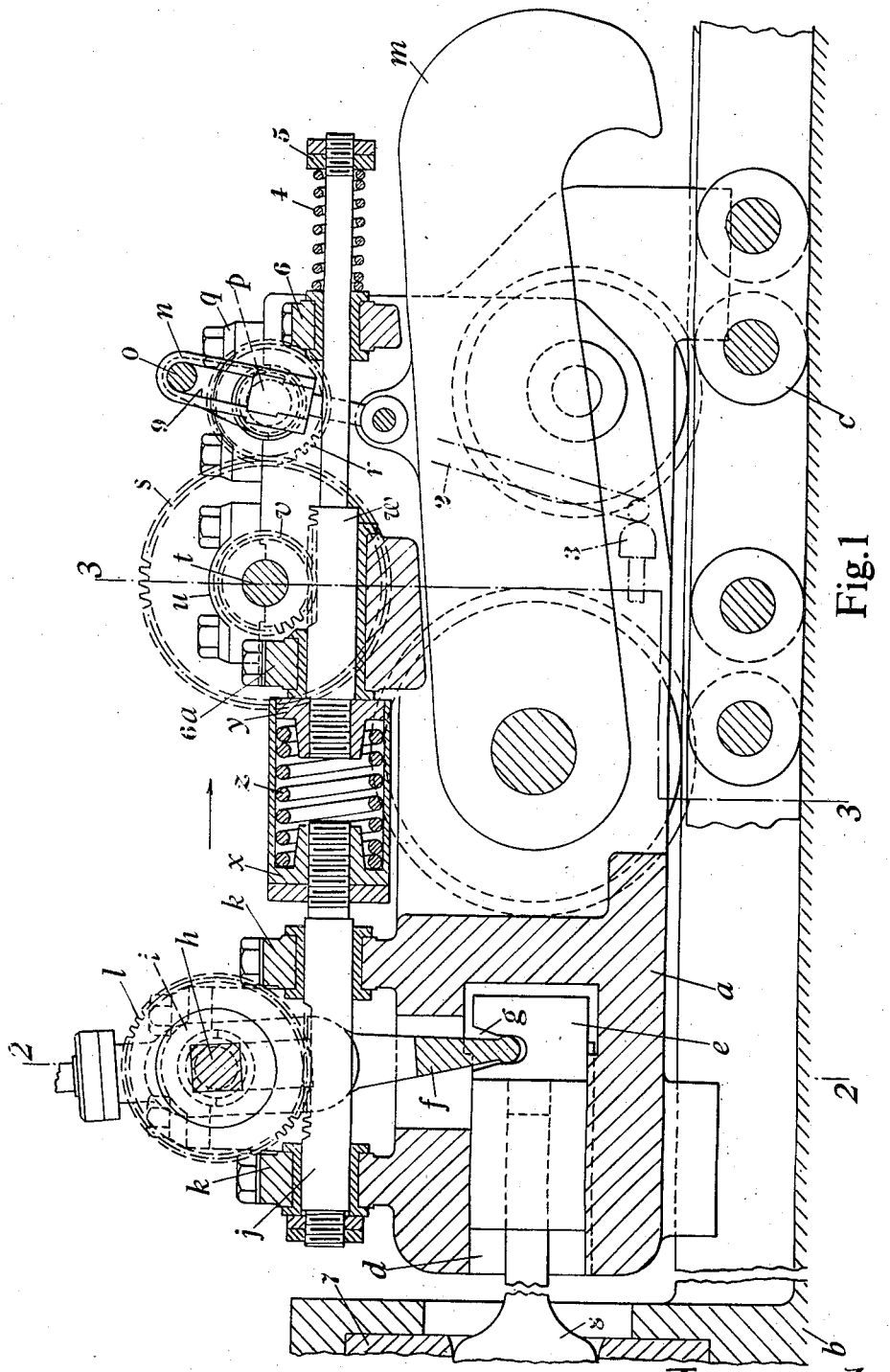

April 18, 1944. D. W. T. EVANS 2,347,038
DRAW BENCH DOG
Filed Nov. 11, 1943 2 Sheets-Sheet 1

Inventor
D. W. T. Evans

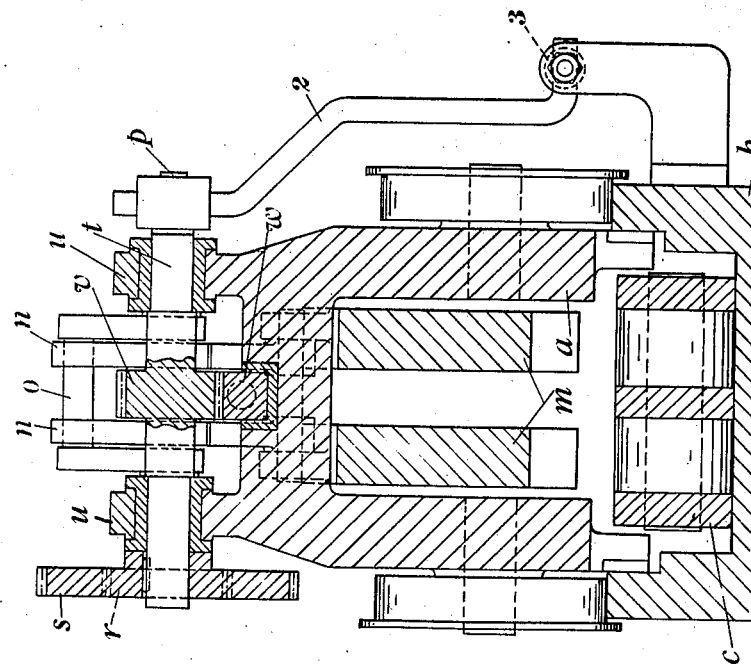

Patented Apr. 18, 1944

2,347,038

UNITED STATES PATENT OFFICE 2,347,038

DRAWBENCH DOG

David William Thomas Evans, Sutton Coldfield, England, assignor to T. I. (Group Services) Limited, Birmingham, England Application November 11, 1943, Serial No. 509,891
In Great Britain November 9, 1942

5 Claims. (Cl. 205—24)

This invention relates to the dogs used for pulling tubular or other work-pieces through dies on draw benches.

The object of the invention is to provide an improved dog adapted to effect automatic engagement of its grippers with the end of the work-piece (or an attachment on the end of the work-piece) previously inserted through the die, in a reliable manner which minimizes risk of slipping of the grippers along the work-piece (or the said attachment) during the engaging operation and which, when the grippers are required to engage a tagged end on the work-piece, enables a short tagged end to be used with consequent reduction of waste.

The invention comprises the combination with a carriage adapted to move along a draw bench under the action of a chain and having grippers for pulling the work-piece through a die, of a hook pivoted on the carriage and adapted to effect detachable engagement with the chain, a crank mechanism adapted to hold the hook in an upper position clear of the chain and to receive movement from the hook when the latter descends under its own weight into engagement with the chain, and means operable by the crank mechanism under the action of the hook for moving the grippers into their active position.

In the accompanying sheets of explanatory drawings:

Figure 1 is a sectional elevation of a draw bench dog constructed in accordance with the invention.

Figures 2 and 3 are sections taken respectively on the lines 2—2 and 3—3 of Figure 1.

In constructing the draw bench dog shown in the drawings, I employ a carriage $a$ movable in the operative direction (indicated by the arrow in Figure 1) on the drawbench $b$ under the action of the usual chain $c$. In a cavity $d$ at the rear end of the carriage $a$ are mounted a pair of grippers $e$, the sides of the grippers being adapted to inter-act with the walls of the cavity in the usual wedge-like manner so that sliding movement of the grippers in the one direction relatively to the carriage causes them to close together and movement in the opposite direction causes them to separate. Actuation of the grippers $e$ is effected by a lever $f$ which at its lower end engages a slot $g$ formed across the tops of the grippers, the lever being mounted on and operatively connected to a horizontal pivot spindle $h$ supported by bearings $i$ on the carriage $a$. On the pivot spindle $h$ is secured a toothed wheel $l$, and the latter engages a slidable horizontal rack $j$ mounted in bearings $k$ on the carriage $c$.

A hook $m$ for effecting detachable engagement with the drawbench chain $c$ is pivoted on the carriage $a$, and its mass is made sufficient to enable it to effect the required actuation of the grippers $e$. To the upper side of the hook $m$ and near its centre is pivotally attached a slotted link $n$ through which passes the cranked portion $o$ of a crank shaft $p$ supported by bearings as $q$ on and arranged transversely across the upper side of the carriage $a$. On one end of the crank shaft $p$ is secured a toothed wheel $r$ which engages a larger toothed wheel $s$ on a spindle $t$ mounted in bearings $u$ on the carriage $a$ parallel to the crank shaft. The spindle $t$ of the larger wheel $s$ is provided with a pinion $v$ engaging a second slidable rack $w$ mounted in alignment with the first mentioned rack $j$. On the adjacent ends of the two racks $j$, $w$ are secured abutments $x$, $y$, the abutment $x$ being adjustable on the rack $j$, and the abutment $y$ being fixed on the rack $w$. Between the abutments $x$, $y$ is placed a strong compression spring $z$, the distance between the abutments being such that, at the commencement of each cycle of operations, it is greater than the length of the spring, so as to provide a certain amount of lost motion before the spring comes into action. On the end of the crank shaft $p$ remote from the toothed wheel $r$ is secured a lever 2 adapted to co-operate with a stop 3 suitably positioned on the draw bench $b$.

To enable the action of the above described dog to be understood, let it be supposed that the carriage $a$ is being returned along the draw bench $b$ with its hook $m$ clear of the chain $c$. This movement of the carriage $a$ is effected in any ordinary manner, and during this movement the hook $c$ is held in its raised position by the crank $o$, which occupies the position at one side of its upper dead centre shown in Fig. 1. The crank $o$ is caused to remain in this position by the action of any suitable light spring as 4 which may be fitted in a variety of ways. In the example shown the spring 4 surrounds the forward end of the second rack $w$, one end of the spring abutting against a collar 5 on the second rack and the other end against one (6) of a pair of bearings 6, 6ª, which support this rack. Further movement of the crank $o$ on this side of its upper dead centre is prevented by the abutment $y$ on the second rack $w$, this abutment serving by contact with the adjacent bearing 6ª as a stop for limiting movement of the second rack in a forward direction. When the carriage $a$ approaches the fixed die 7, through which the tagged end of a tube 8 has already been inserted, one end of the lever 2 on the crank shaft $p$ is arrested by the stop 3, and continued movement of the carriage causes the crank to move through a small angle to the side of its upper dead centre opposite that shown in Fig. 1. The hook $m$ is no longer held in raised position and descends under gravity towards the chain $c$ and in so doing it imparts movement to the crank $o$. The stop 3 is so positioned on the draw bench $b$ that the crank $o$ arrives at the point where the hook $m$ is released at the same time as the carriage $a$ arrives at its most backward position adjacent to the die 7, and thus becomes stationary. This first movement of the crank $o$ by the lever 2 is an idle motion, its only effect on the second rack $w$ being to move the latter sufficiently to take up the lost motion between the abutment $y$ and the spring $z$. The hook $m$ in descending imparts further movement to the crank $o$ which causes the second rack $w$ to impart endwise movement to the first rack $j$ through the intermediate strong spring $z$, and this movement serves to close the grippers $e$ on to the tagged end of the tube 8. The mechanism is so adjusted that the grippers $e$ are closed at a time when the hook $m$ is about to enter the chain $c$. By adjusting the abutment $x$ on the rack $j$, the gap between the abutment $y$ on the other rack $w$ and the adjacent end of the spring $z$ can be altered to vary the position of the hook $m$ relatively to the chain $c$ at the instant when the grippers $e$ are about to be closed, and thus to vary the instant at which the weight of the hook is exerted on the grippers. Continued downward movement of the hook $m$ until it fully engages the chain $c$ increases the closure pressure exerted on the grippers $e$ through the racks $j$, $w$ and the intermediate strong spring $z$ which latter becomes compressed due to the continued movement of the second rack $w$ and the inability of the first rack $j$ to move any further. Immediately after the hook $m$ engages the chain $c$ the latter exerts its pull on the carriage $a$, and the resistance set up between the tube 8 and die 7 causes the grippers $e$ to increase their hold on the tube and commence the movement of the tube through the die. At the same time, on account of the pull exerted by the chain $c$, the portion of the chain engaged by the hook $m$ rises in the well known manner, and consequently the hook returns to its previous upper position, the hook and chain remaining in engagement. In certain cases the hook $m$ may be caused to rise above its normal upward position and this occurrence is provided for by having a slot 9 in the link $n$ connecting the hook to the crank $o$ and thus providing a lost motion. The relatively light spring 4 now returns the second rack $w$ to its initial position and causes the crank $o$ to return to a position at the side of the upper dead centre where it can hold the hook $m$ in its upper position. When the tube 8 has completed its passage through the die 7, the load on the chain $c$ is thereby relaxed and the raised portion of the chain falls away from the hook $m$, leaving the carriage $a$ free to be returned. At the same time the pull which held the grippers $e$ in tight engagement with the tagged end of the tube 8 is also relaxed, and the grippers and the associated lever $f$ and rack $j$ are returned to their initial postions by another spring as 10 provided for this purpose. This spring 10 may be fitted in a variety of ways, and in the example shown is mounted in a vertical position on the carriage $a$ so as to act on an abutment 11 carried by an arm 12 secured to the spindle $h$ of the first rack wheel $l$. Any such spring provided for the above purpose would be compressed by the gripper closing movement transmitted from the hook $m$ through both first and second racks $j$, $w$.

In the above description I have assumed that the work-piece to be drawn through the die was a metal tube having a tagged end. The invention is especially suitable for draw benches required to effect drawing operations on metal tubes. An important advantage resulting from the invention is that as the grippers are positively closed on to the tagged end, risk of initial slipping between the grippers and the work-piece at the commencement of a drawing operation is minimised or eliminated and in consequence a shorter tag than usual can be formed on the tube, thus saving material which is ordinarily wasted in the tag. The invention is, however, advantageously applicable to the drawing of tubes when a so-called drawing pin is attached to the forward end of the tube for engagement by the grippers. Also the invention is not limited to tube drawing operations, as it may be usefully employed in drawing operations on solid metal rods or bars. Moreover, the invention is not limited to the example described as subordinate mechanical or constructional details may be modified to suit different requirements.

Having thus described my invention what I claim as new and desire to secure by Letters Patent is:

1. A draw bench dog comprising the combination with a carriage adapted to move along a draw bench under the action of a chain and having grippers for pulling the work-piece through a die, of a hook pivoted on the carriage and adapted to effect detachable engagement with the chain, a releasable crank mechanism operable in one position to hold the hook in an upper position clear of the chain and receiving movement from the hook when the latter descends under its own weight into engagement with the chain, means for releasing the crank mechanism whereby the hook may descend, members operable by the crank mechanism under the action of the hook for moving the grippers into their active position and an adjustable coupling accommodating limited movement of one of such members relatively to the other member during movement of the grippers into active position.

2. A draw bench dog as claimed in claim 1 wherein said coupling includes yieldable means for imparting movement from the first to the second mentioned members.

3. A draw bench dog comprising the combination with a carriage adapted to move along a draw bench under the action of a chain and having grippers for pulling the work-piece through a die, of a hook pivoted on the carriage and adapted to effect detachable engagement with the chain, a crank mechanism adapted to hold the hook in an upper position clear of the chain and to receive movement from the hook when the latter descends under its own weight into engagement with the chain, and means operable by the crank mechanism under the action of the hook for moving the grippers into their active position, the means operable by the crank mechanism including a pair of racks arranged in alignment with each other, a spring arranged between the adjacent ends of the racks, gearing interconnecting the crank mechanism and one of the racks, a toothed wheel engaging the other of the racks, and a lever for imparting movement from the toothed wheel to the grippers.

4. A draw bench dog as claimed in claim 1 wherein the first mentioned member is directly coupled with the hook and the second mentioned member is directly coupled with the grippers.

5. A draw bench dog as claimed in claim 1 having means normally tending to move the first mentioned member in the direction opposite that in which it is moved incident to the descent of said hook, and means cooperating with the other member normally tending to move the grippers to inactive position.

DAVID WILLIAM THOMAS EVANS.